United States Patent Office 3,660,428
Patented May 2, 1972

3,660,428
PRODUCTION OF FORMYLMETHYLENE-PHTHALIMIDINES
Matthias Seefelder, Ludwigshafen, and Hans-Richard Mueller, Fossgoenheim, Germany, assignors to Badische Anilin- & Soda-Fabrik Aktiengesellschaft, Ludwigshafen (Rhine), Germany
No Drawing. Filed July 9, 1969, Ser. No. 840,512
Claims priority, application Germany, July 9, 1968, P 17 70 826.8
Int. Cl. C07d 27/50
U.S. Cl. 260—325                                 8 Claims

ABSTRACT OF THE DISCLOSURE

Production of formylmethylenephthalimidines by reaction of acetophenone-o-carboxylic amides with the reaction product of a formamide and an acid halide followed by hydrolysis of the reaction product. The formylmethylenephthalimidines are starting materials for the production of dyes, dyeing assistants, printing auxiliaries and pesticides.

---

This invention relates to a process for the production of formylmethylenephthalimidines by reaction of acetophenone-o-carboxylic amides with the reaction product of a formamide and an acid halide followed by hydrolysis of the reaction product, and to the new substances thus obtained.

It is known from Ber., 99, 3444 et seq. (1966), to react N-methylphthalimide with ethoxyacetylene magnesium bromide, hydrogenate the reaction product and then produce 1-oxo-2-methyl-3-formylmethyleneisoindoline by treatment of the hydrogenation product with hydrochloric acid. The process is uneconomic for industrial operation, uses difficulty accessible starting materials and is unsatisfactory as regards yield and purity of the end product.

The reaction of 4-methyleneoxazaolidinones-(2) with formamide chloride followed by hydrolysis of the reaction product into 4-formylmethylene compounds is described in U.S. patent specification No. 3,455,947.

It is an object of this invention to provide a new process for the production of a large number of formylmethylenepthalimidines by a simple method and in good yields and purity.

Another object of this invention is the new formylmethylenepthalimidines.

These and other objects of the invention are achieved and formylmethylenephthalimidines having the general formula:

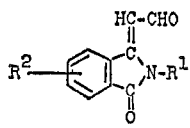

(I)

where $R^1$ and $R^2$ may be identical or different and each denotes and aliphatic, cycloaliphatic, araliphatic or aromatic radical, $R^2$ may also denote an alkoxy group or a hydrogen atom, are obtained advantageously by reacting an acetophenone-o-carboxylic amide having the general formula:

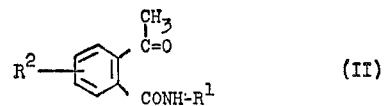

(II)

where $R^1$ and $R^2$ have the meanings given above, with a reaction product of a formamide having the general formula:

(III)

where $R^3$ and $R^4$ may be identical or different and each denotes an aliphatic or aromatic radical or $R^3$ and $R^4$ together with the adjacent nitrogen atom may be members of a heterocyclic ring, and an acid halide in the presence of an organic solvent and hydrolyzing the resultant product.

When dimethylformamide, phosgene and acetophenone-o-carboxylic-N-methylamide are used, the reaction may be reproduced by the following equation:

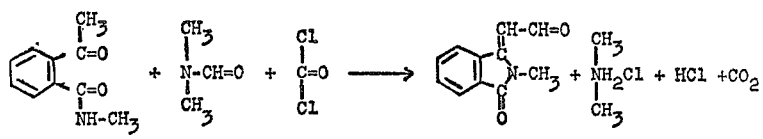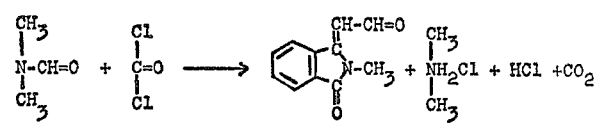

In relation to the prior art, the process according to this invention surprisingly provides in a simple way a large number of formylmethylenephthalimidines in good yields and purity. It was not to be expected that ring closure of the phthalimidine group and and formylation would be achieved simultaneously and with advantageous results. Moreover it was to be feared that other reactions, for example formation of amide chloride at the O-carboxylic amide radical of starting material (II), would play an important part.

Preferred starting materials having the general Formula II and accordingly preferred end products (I) are those in whose Formulae $R^1$ and $R^2$ may denote identical or different alkyl radicals having one, two or up to six carbon atoms, cycloalkyl radicals having up to eight carbon atoms aralkyl, radicals having up to ten carbon atoms, phenyl radicals or naphthyl radicals, and $R^2$ may also denote an alkoxy group having up to six carbon atoms or a hydrogen atom. The said radicals may also bear, as substituents, groups and/or atoms which are inert under the reaction conditions, for example alkyl or alkoxy groups in each case with up to four carbon atoms, phenyl groups, phenylamino groups, dialkylamino groups having up to eight carbon atoms, chlorine atoms or bromine atoms.

For example the following acetophenone-o-carboxylic amides may be used as starting materials (II):

6-ethylacetophenone-2-carboxylic-N-methylamide,
3-cyclohexylacetophenone-2-carboxylic-N-methylamide,
6-benzylacetophenone-2-carboxylic-N-methylamide,
4-phenylacetophenone-2-carboxylic-N-methylamide,
4-naphthylacetophenone-2-carboxylic-N-methylamide,
3-propoxyacetophenone-2-carboxylic-N-methylamide,
4-isobutylacetophenone-2-carboxylic-N-methylamide,
acetophenone-2-carboxylic-N-isopropylamide and the corresponding N-cyclohexyl, N-benzyl, N-phenyl, N-naphthyl N-(1-methoxy)-propyl-(3), N-p-toluyl, N-p-diphenyl, N-p-ethoxyphenyl, N-o-chlorophenyl, N-p-di-dimethylaminophenyl and N-p-diphenylamino compounds.

The starting material (II) is reacted with a reaction product of a formamide (III) and an acid halide. Preferred formamides having the general Formula III are those in whose formulate $R^3$ and $R^4$ are identical or different and each denotes an alkyl radical having from one to four carbon atoms or an aryl radical having from six to ten carbon atoms, such as methyl, ethyl, isopropyl, butyl or phenyl radicals. $R^3$ and $R^4$ may also form, together with the nitrogen atom, members of a heterocyclic ring preferably having five or six members. Examples of such formamides are: N,N-dimethylformamide, N-methylformanilide, N-formylpiperidine, N-formylpyrrolidone and N-formylmorpholine. Organic acid halides and particularly inorganic acid halides such as phosgene, oxalyl chloride, thionyl chloride, phosphorus oxychoride, phosphorus trichloride, sulfuryl chloride, phosphorus tribromide and oxalyl bromide are suitable for the reaction. The formamide may be used in a stoichiometric amount with reference to the starting material (II) or in excess, preferably in a ratio of from 2 to 4 moles of starting material (III) per mole of starting material (II). Generally the said acid chlorides acid bromides are reacted with the formamides in a ratio of from 1 to 2 moles per mole of formamide.

The reaction is carried out as a rule at a temperature of from 0° to 120° C., preferably from 0° to 80° C., at atmospheric or super-atmospheric pressure, continuously or in batches. The starting materials are reacted in the presence of an organic solvent. Examples of suitable solvents are hydrocarbons such as cyclohexane or toluene, chlorohydrocarbons such as chloroform and carbon tetrachloride, and ethers such as tetrahydrofuran, dioxane or glycol dimethyl ether. A preferred embodiment of the process uses an excess of formamide to serve at the same time as the solvent for the reaction. The amount of solvent is in general from 10 to 1000% by weight with reference to the starting material (II).

The hydrolytic cleavage of the reaction product is carried out as a rule by the conventional methods at a temperature of from 0° to 100° C., preferably in an aqueous alkaline medium having a pH value of from 7.5 to 12. The solvent is advantageously removed prior to the hydrolysis.

The pH value is generally adjusted to the stated range with an alkali metal hydroxide, for example sodium hydroxide, or an alkali metal carbonate, for example sodium carbonate.

The reaction may be carried out as follows: a mixture of starting material (II), solvent, formamide (III) and acid halide is reacted for from two to five hours at the reaction temperature while mixing well. It is advantageous to begin at a low temperature and then raise the reaction temperature slowly during the reaction period. The solvent is then distilled off and the residue treated with water and an alkaline compound, as a rule for from one to one hundred minutes. The end product formed by the treatment is then separated in a conventional manner, for example by filtration.

The new compounds which can be prepared by the process according to the invention are valuable starting materials for the production of dyes, dyeing assistants, printing auxiliaries and pesticides. For example the dye yield of print pastes on cellulose cloth can be improved with them. The print pastes may be pastes conventionally used for printing these fibers, for example in the case of reactive dyes they may consist of 1500 grams of alginate thickening, 100 grams of urea, 20 grams of sodium bicarbonate, 20 grams of dye (dissolved in 250 grams of hot water) and 20 grams of end product (I). The substances according to this invention moreover accelerate the uniform penetration of the dye into the textile fabric and this is advantageous, especially in the case of closely woven hard twisted textile goods or heavy fabric.

The invention is illustrated by the following examples. The parts given in the examples are part by weight.

EXAMPLE 1

25 parts of phosgene is passed into a mixture of 200 parts of chloroform and 16 parts of dimethylformamide at from 0° to 5° C. The mixture is then stirred for one hour at room temperature and cooled to 0° to 5° C. 17.7 parts of acetophenone-o-carboxylic-N-methylamide is introduced slowly in portions while cooling. The whole is then stirred for half an hour at from 5° to 10° C., for one hour at from 20° to 25° C., for one hour at from 45° to 50° C. and for one hour at refluxing temperature.

The solvent is then distilled off, the residue is dissolved in water and the aldehyde is precipitated by adding aqueous caustic soda solution until the solution has an alkaline reaction. The end product is suction filtered, washed with water until neutral and dried. 18.7 parts (99% of the theory) of N-methylformylmethylenepthalimidine is obtained having a melting point of 182° C. (recrystallized from ethanol).

EXAMPLE 2

36 parts of phosphorus oxychloride is introduced at from 0° to 5° C. into a mixture of 200 parts of ethylene chloride, 16 parts of dimethylformamide and 25.3 parts of acetophenone-o-carboxylic-N-benzylamide. The mixture is stirred for half an hour at from 5° to 10° C. and for one hour at refluxing temperature. The solvent is then distilled off, the residue is dissolved in water and the end product is precipitated by adding aqueous sodium carbonate solution (about 5% by weight). It is suction filtered, washed with water and dried. 21 parts (80% of the theory) of N-benzylformylmethylenephthalimidine having a melting point of 126° C. is obtained. The compound may be recrystallized from alcohol to purify it. The melting point of the purified sample is 127° C.

EXAMPLE 3

25 parts of phosgene is passed at from 0° to 5° C. into a mixture of 200 parts of trichloroethylene, 30 parts of N-methylformanilide and 20.5 parts of acetophenone-o-carboxylic-N-propylamide. The mixture is stirred for half an hour at from 5° to 10° C., one hour at from 25° to 30° C. and for one hour at refluxing temperature.

The whole is worked up as described in Example 2. 18 parts (84% of the theory) of N-propylformylmethylenephthalimidine having a melting point of 92° C. is obtained.

EXAMPLES 4 TO 7

In the manner described in Example 2, 18 parts of dimethylformamide is reacted with the following starting materials (II), the amount of end product given in the table being obtained.

| Example | Starting material (II) |
|---|---|
| 4 | 24.4 parts of N-cyclohexylacetophenone-o-carboxylic-amide. |
| 5 | 23.9 parts of N-phenylacetophenone-o-carboxylic-amide. |
| 6 | 26.8 parts of acetophenone-o-carboxylic-p-anisidide. |
| 7 | 27.4 parts of acetophenone-o-carboxylic-p-chloroanilide. |

| Example | End product | Yield in percent of theory | M.P., °C. |
|---|---|---|---|
| 4 | 21 parts of N-cyclohexylformyl-methylenephthalimidine. | 82 | 112–114 |
| 5 | 24.4 parts of N-phenylformyl-methylenephthalimidine. | 99.9 | 150–153 |
| 6 | 27 parts of N-p-methoxyphenyl-formylmethylenephthalimidine. | 97 | 139–141 |
| 7 | 28 parts of N-p-chlorophenylformyl-methylenephthalimidine. | 99.9 | 137–139 |

We claim:
1. A process for the production of a formylmethylene-phthalimidine having the formula:

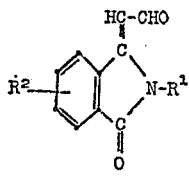

(I)

where $R^1$ and $R^2$ each denotes a hydrocarbon radical selected from the group consisting of alkyl of one to six carbon atoms, cycloalkyl of up to eight carbon atoms, aralkyl radicals of up to ten carbon atoms, phenyl and naphthyl, $R^2$ may also further denote alkoxy of up to six carbon atoms or hydrogen while said hydrocarbon radicals may also bear a substituent selected from the group consisting of alkyl of up to four carbon atoms, alkoxy of up to four carbon atoms, phenyl, phenylamino, dialkylamino of up to eight carbon atoms, chlorine and bromine which process comprises:

Reacting
(A) anacetophenone-o-carboxylic amide having the formula:

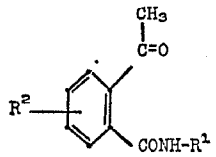

(II)

where $R^1$ and $R^2$ have the above meanings with
(B) the reaction product of a formamide having the formula:

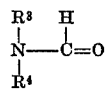

(III)

where $R^3$ and $R^4$ each denotes a hydrocarbon radical selected from the group consisting of alkyl of one to four carbon atoms and aryl of six to ten carbon atoms, and
(C) an acid halide selected from the group consisting of phosgene, oxalyl chloride, thionyl chloride, phosphorus oxychloride, phosphorus trichloride, sulfuryl chloride, phosphorus tribromide and oxalyl bromide in the presence of an organic solvent; and hydrolyzing the resultant product.

2. A process as claimed in claim 1 wherein the reaction is carried out with a ratio of from 2 to 4 moles of starting material (III) to each mole of starting material (II).

3. A process as claimed in claim 1 wherein the reaction is carried out with the reaction product of formamide and an acid halide in a ratio of from one mole to 2 moles for each mole of formamide.

4. A process as claimed in claim 1 wherein the reaction is carried out at a temperature of from 0° to 120° C.

5. A process as claimed in claim 1 wherein the reaction is carried out at a temperature of from 0° to 80° C.

6. A process as claimed in claim 1 wherein the reaction is carried out using an excess of formamide as the solvent for the reaction.

7. A process as claimed in claim 1 wherein the reaction is carried out with an amount of solvent of from 10 to 1000% by weight with reference to starting material (II).

8. A process as claimed in claim 1 wherein the hydrolytic cracking of the reaction product is carried out at a temperature of from 0° to 100° C. in an aqueous alkaline medium at a pH value of from 7.5 to 12.

References Cited

Flitsch et al.: Ber. 99; 3444–49 (1966).

ALEX MAZEL, Primary Examiner

J. A. NAHCAVAGE, Assistant Examiner

U.S. Cl. X.R.

8—87

PO-1050
(5/69)

UNITED STATES PATENT OFFICE
CERTIFICATE OF CORRECTION

Patent No. 3,660,428                                Dated May 2, 1972

Inventor(s) Matthias Seefelder and Hans-Richard Mueller

It is certified that error appears in the above-identified patent and that said Letters Patent are hereby corrected as shown below:

Column 1, line 5, "Fossgoenheim" should read -- Fussgoenheim --; line 47, "4-methyleneoxazaolidinones-(2)" should read -- 4-methyleneoxazolidinones-(2) --.

Column 2, line 48, "atoms aralkyl, radicals" should read -- atoms, aralkyl radicals --; line 71, "N-p-di-dimeth-" should read -- N-p-dimeth- --.

Column 3, line 4, "formulate" should read -- formulae --; line 70, "a-" should read -- ac- --.

Column 5, line 24, claim 1, "anacetophenone-o-carboxylic" should read -- an acetophenone-o-carboxylic --.

Signed and sealed this 28th day of November 1972.

(SEAL)
Attest:

EDWARD M. FLETCHER, JR.
Attesting Officer

ROBERT GOTTSCHALK
Commissioner of Patents